United States Patent
Lai et al.

(10) Patent No.: US 9,633,140 B2
(45) Date of Patent: Apr. 25, 2017

(54) AUTOMATED CONTEXTUAL INFORMATION RETRIEVAL BASED ON MULTI-TIERED USER MODELING AND DYNAMIC RETRIEVAL STRATEGY

(75) Inventors: Jennifer Lai, Garrison, NY (US); Jie Lu, Hawthorne, NY (US); Shimei Pan, Elmsford, NY (US); Zhen Wen, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 209 days.

(21) Appl. No.: 13/024,467

(22) Filed: Feb. 10, 2011

(65) Prior Publication Data

US 2012/0209871 A1    Aug. 16, 2012

(51) Int. Cl.
   *G06F 7/00*        (2006.01)
   *G06F 17/30*      (2006.01)
   *H04L 12/58*      (2006.01)

(52) U.S. Cl.
   CPC ........ *G06F 17/30997* (2013.01); *H04L 51/02* (2013.01)

(58) Field of Classification Search
None
See application file for complete search history.

(56) References Cited

U.S. PATENT DOCUMENTS

| | | | |
|---|---|---|---|
| 6,236,768 B1 | 5/2001 | Rhodes et al. | 382/306 |
| 6,895,083 B1* | 5/2005 | Bers | H04M 3/5232 379/266.02 |
| 7,610,279 B2* | 10/2009 | Budzik | G06F 17/30389 |
| 2003/0163537 A1* | 8/2003 | Rohall et al. | 709/206 |
| 2004/0002959 A1 | 1/2004 | Alpert et al. | 707/3 |
| 2006/0136391 A1 | 6/2006 | Morris | 707/3 |
| 2007/0185859 A1* | 8/2007 | Flowers | G06F 17/30864 |

(Continued)

OTHER PUBLICATIONS

Dredze et al., "Generating Summary Keywords for Emails Using Topics", IUI '08, pp. 199-206, Maspalomas, Gran Carania, Spain (2008).

(Continued)

*Primary Examiner* — Debbie Le
*Assistant Examiner* — Hasanul Mobin
(74) *Attorney, Agent, or Firm* — Ryan, Mason & Lewis, LLP

(57) ABSTRACT

Automated contextual information retrieval techniques are provided based on multi-tiered user modeling and a dynamic retrieval strategy. Content relevant to a current message is presented by initially obtaining a multi-tiered user model containing a multi-tiered representation of interactions of a first user with each contact, wherein the multi-tiered representation includes a plurality of topic models each corresponding to interactions between the first user and one contact. The topic models contain a set of topics, each containing topic keywords. Context information is extracted based on content of the current message, a sender and/or a recipient of the current message, and the multi-tiered user model. A retrieval strategy is determined based on the extracted context information. Contextual queries are generated to search the information repositories selected based on the determined retrieval strategy. Content relevant to the current message is presented based on search results from the selected information repositories.

20 Claims, 10 Drawing Sheets

(56) References Cited

U.S. PATENT DOCUMENTS

| | | | |
|---|---|---|---|
| 2008/0115149 A1 | 5/2008 | Rupp et al. | 719/318 |
| 2008/0222283 A1 | 9/2008 | Ertugrul et al. | 709/224 |
| 2009/0157570 A1* | 6/2009 | Pall | G06F 21/6218 706/11 |
| 2009/0248635 A1* | 10/2009 | Gross | 707/3 |
| 2010/0100546 A1 | 4/2010 | Kohler | 707/739 |
| 2011/0213655 A1* | 9/2011 | Henkin | G06Q 30/00 705/14.49 |
| 2012/0095952 A1* | 4/2012 | Archambeau | G06K 9/6249 706/52 |

OTHER PUBLICATIONS

Faulring et al., "Agent-Assisted Task Management that Reduces Email Overload", IUI '10, pp. 61-70, Hong Kong, China (2010).

Goodman et al., "Implicit Queries for Email", The Confrence on Email and Anti-Spam (CEAS) 2005.

Callum et al., "Topic and Role Discovery in Social Networks with Experiments on Enron and Academic Email", Journal of Artificial Intelligence Research, pp. 249-272 (2007).

Segal et al., "MailCat: An Intelligent Assistant for Organizing E-Mail", In Proceedings of the Third International Conf on Autonomous Agents (1999).

Gauch et al., "Ontology-Based Personalized Search and Browsing", Web Intelligence and Agent Systems (2003).

Kraft et al., "Y!Q: Contextual Search at the Point of Inspiration", CIKM '05, Bremen, Germany, pp. 816-823 (2005).

Shen et al., "Context-Sensitive Information Retrieval Using Implicit Feedback", SIGIR '05, Salvador, Brazil (2005).

Shen et al., "Exploiting Query History for Document Ranking in Interactive Information Retrieval", SIGIR '03, Toronto, Canada (2003).

Speretta, Micro, "Personalizing Search Based on User Search Histories", Web Intelligence (2005).

Teevan et al., "Personalizing Search via Automated Analysis of Interests and Activities", SIGIR '05, Salvador, Brazil (2005).

Wen et al., "Context-Aware, Adaptive Information Retrieval for Investigative Tasks", IUI '07, Honolulu, Hawaii (2007).

Billsus et al., "Improving Proactive Information Systems", IUI '05San Diego, California (2005).

Budzik et al., "Watson: Anticipating and Contextualizing Informaiton Needs", In proc. of the Sixty-second Annual Meeting of the American Society for Information Science (1999.

Dumais et al., "Implicit Queries (IQ) for Contextualized Search", SIGIR '04, Sheffield, South Yorkshire, UK (2004).

Rhodes et al., "Just-in-time Information Retrieval Agents", IBM Systems Journal, vol. 39, Nos. 3 & 4 (2000).

Rhodes et al., "Remembrance Agent: A continuously running automated information retrieval system", PAAM '96, pp. 487-495 (1996).

Olsson et al., "Personzlized Decentralized Communication", Swedish Institute of Computer Science, Box 1263, SE-164 29 Kista, Sweden.

Su et al., "An Exploration in Personalized and Context-Sensitive Search", Proceedings of the 7th annual UK Special Interest (2003).

* cited by examiner

FIG. 9

| LABEL | CALCULATION |
|---|---|
| interaction_freq_person interaction_freq_group | $\min(f, T) / T$ where: $f$ is the total number of email and calendar messages included in the user's interaction with the person/group associated with the current message, $T$ is the interaction frequency threshold (empirically set to 50 for a person and 10 for a group). |
| interaction_recency_person interaction_recency_group | $1/(\log(d_{current} - d_{most\_recent} + 1) + 1)$ where $d_{current}$ is the current date, and $d_{most\_recent}$ is date of the user's most recent interaction with the person/group. |
| relationship_strength_person | $r_p$ whose value is: 1.0 if the user and the person $p$ has a managing/manged relationship or if they have the same direct manager; 0.8 if they have co-authored any paper/patent; 0.6 if they are co-memebers of the same online community/wiki, friends of the online social network, or have shared files with each other; 0.2 for other online relationships such as tagging/tagged. |
| best_match_group_score | $\max_g\,(match(g,g'))$ where $match(g,g')$ is calculated using Formulas 1–3. |
| msg_is_threaded | 1 if the message belongs to an email thread of multiple message, and 0 otherwise. |
| topic_familiarity_user | The user's familiarity with the topic inferred from the current message, which is equal to the probability of the inferred topic. |
| topic_familiarity_person | $\min(n_o, T_o) / T_o$ where: $n_o$ is the number of online documents authored by the person associated with the current message (e.g. sender), retrieved using the top 5 keywords associated with the inferred topic, and $T_o$ is the topic familiarity document threshold (set to 10 empirically). |
| best_match_topic_model | The topic model with the best degree of match between its interaction scope and the interaction scope of the current message. |

| LABEL | VALUE SET |
|---|---|
| profile_type | {min, short, long} |
| doc_author | {user, sender, both, any} |
| doc_type | {basic, detailed, all} |
| msg_filter | {thread, group, person, none} |
| sort_by | {relevance, date} |

AUTOMATED CONTEXTUAL INFORMATION RETRIEVAL BASED ON MULTI-TIERED USER MODELING AND DYNAMIC RETRIEVAL STRATEGY

FIELD OF THE INVENTION

The present invention relates generally to the electrical, electronic and computer arts, and, more particularly, to contextual information retrieval (IR) for electronic mail (email) systems.

BACKGROUND OF THE INVENTION

In this age of "email overload," knowledge workers must allocate a significant amount of time required to manage their emails. While a number of techniques have been proposed or suggested for reinventing email systems, the most popular commercially-available products, such as Lotus Notes® and Microsoft Exchange®, remain essentially unchanged, 'overloaded' communication tools.

Knowledge workers often must synthesize and re-use information that was previously created. Knowledge workers typically must leave the context of an email application in order to find the information necessary to reply to email messages. When the user leaves the current context to gather information (for example, from an online resource or local hard drive) it can cause a delay of hours, or even days. This interruption places the response at risk of falling through the cracks and it increases the cognitive burden. The interruption also increases the feelings of email overload on the user since this task is now extending over time and the user must continue to keep track of the task.

A need therefore exists for improved email systems that automatically generate relevant content in context without requiring users to leave the email application.

SUMMARY OF THE INVENTION

Generally, methods and apparatus are provided for automated contextual information retrieval based on multi-tiered user modeling and a dynamic retrieval strategy. According to one aspect of the invention, content relevant to a current message is automatically presented to a first user by obtaining a multi-tiered user model containing a multi-tiered representation of pair-wise interactions of a first user with each of one or more contacts, wherein the multi-tiered representation includes a plurality of topic models, wherein each of the topic models corresponds to a pair-wise interaction between the first user and one of the contacts, wherein each of the topic models contains a set of topics, wherein each topic contains a list of topic keywords; extracting context information of a current message based on a content of the current message, one or more of a sender and a recipient of the current message, and the multi-tiered user model; determining a retrieval strategy based on the extracted context information of the current message; selecting from a set of information repositories for contextual information retrieval based on the determined retrieval strategy, wherein the net of information repositories comprises one or more of people directories, a local memory, one or more online repositories, an email repository and a calendar entry repository; generating one or more contextual queries to search the selected information repositories; and presenting the content relevant to the current message from the selected information repositories based on the one or more contextual queries. The contacts may comprise, for example, email contacts, calendar contacts, groups of email contacts and/or groups of calendar contacts. The current message may comprise, for example, an email message, a text message or a transcribed voice mail message.

The multi-tiered user model can be obtained by extracting and aggregating information from email and calendar content of the first user, and applying statistical techniques to create topic models corresponding to pair-wise interactions of the first user with each of the contacts of the first user.

The contextual queries to search the selected information repositories can be determined, for example, based on the content of the current message, the topic keywords contained in a determined topic of the current message, one or more of the sender and recipient of the current message, and the determined retrieval strategy.

The topic of the current message can be determined, for example, by selecting one or more topic models from the multi-tiered user model based on one or more of a sender and recipient of the current message, and matching the content of the current message to the topics of the selected topic models to find the best topic.

The content relevant to the current message can be determined, for example, by processing the search results from the selected information repositories based on the context of the current message and the determined retrieval strategy.

A more complete understanding of the present invention, as well as further features and advantages of the present invention, will be obtained by reference to the following detailed description and drawings.

BRIEF DESCRIPTION OF THE DRAWINGS

FIG. 9 is a sample table comprising an exemplary set of context factors;

DETAILED DESCRIPTION OF PREFERRED EMBODIMENTS

The present invention provides email methods and systems with automated contextual information retrieval. The disclosed automated contextual information retrieval email systems automatically generate content that is relevant to a current message. According to one aspect of the invention, the disclosed email systems employ contextual information retrieval (IR) techniques informed by user models and email analytics. Generally, a disclosed user modeling component builds a model for each user based on the email and calendar content associated with that user. A disclosed contextual IR component uses the user model, and the information from the current email message, to determine what content is relevant (e.g., documents from local memory or online resources, or information about the sender). The retrieved information is provided "at the user's fingertips" within the email application so that the user doesn't need to leave his or her current context to gather necessary information.

As discussed hereinafter, the disclosed automated contextual information retrieval email system obtains a comprehensive understanding of the current context by augmenting the content of the current message with a cumulative user model, dynamically built from the user's email and calendar content. In addition, the disclosed user model includes a representation of the user's interactions with different persons/groups on different topics, which enables the context-sensitive information needs to be identified with a finer granularity, leading to higher relevancy of the retrieved content. Further, the disclosed automated contextual information retrieval email system dynamically tailors the retrieval strategy (e.g., the sources to search, the types of documents to retrieve, and the criteria for sorting multiple retrieval results), which improves the usefulness of the retrieved results given the limited screen real estate at the interface.

According to one aspect of the invention, the presented content varies, for example, based on the email recipient's relationship with the email sender, the previous interaction between the sender and the recipient, and the topic of the current message. For example, as discussed further below in conjunction with FIGS. 1-3, the amount of information presented in user profiles may vary based on the relationship between the email user (email recipient) and the person identified in the presented profile (such as an email sender). For example, for a well known sender, the presented information can be limited to basic information about a person such as name, email, and phone number. It serves the purpose of providing the user easy access to the contact information of people whom the user interacts with frequently. For an unknown sender, the presented information can include contact information, photo, geography, and job description.

Exemplary Email Exchanges

Figure 1:
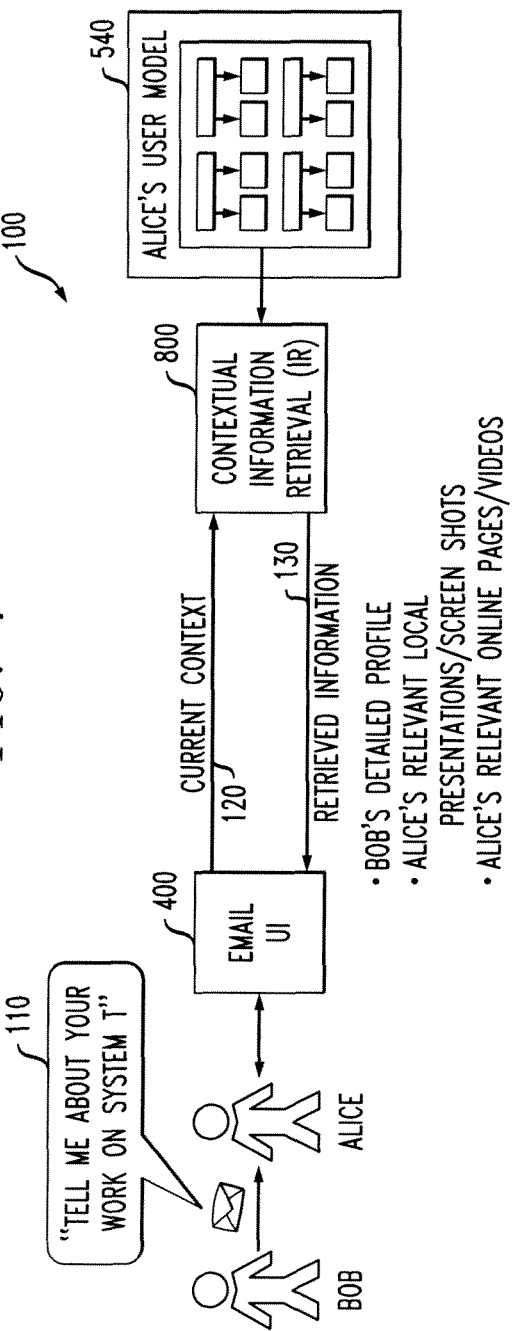
FIGS. 1-3 illustrate an exemplary email exchange for an exemplary email user and associated presentation of tailored and relevant information in accordance with the present invention.
Figure 2:
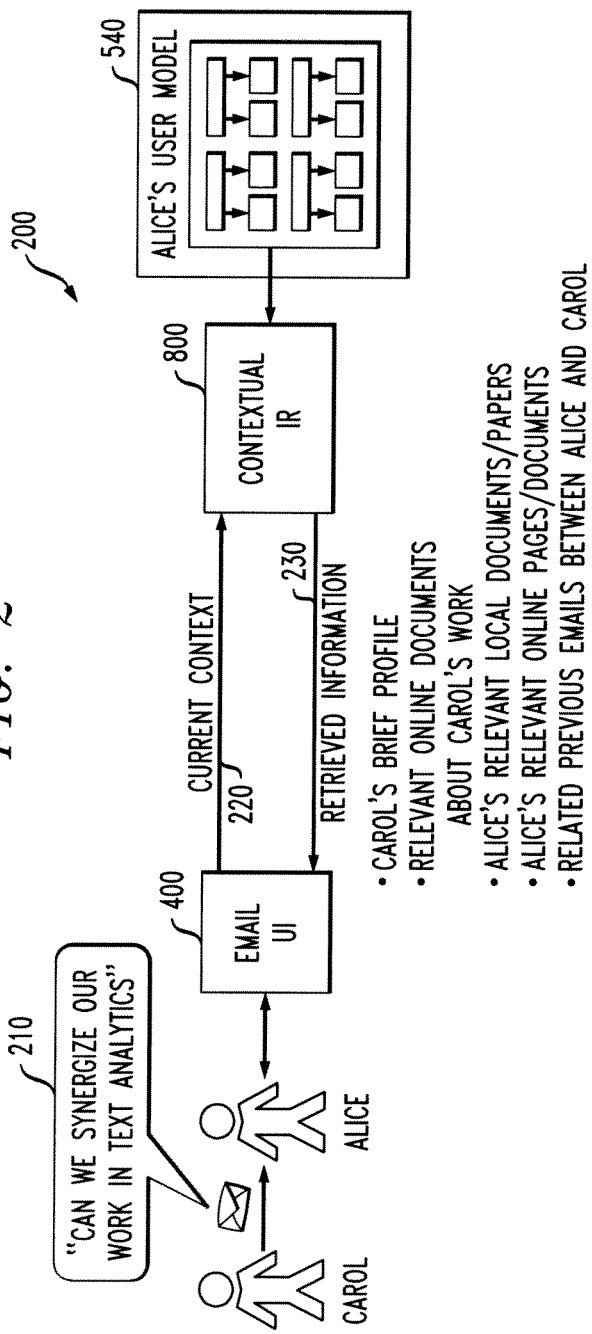
Figure 3:
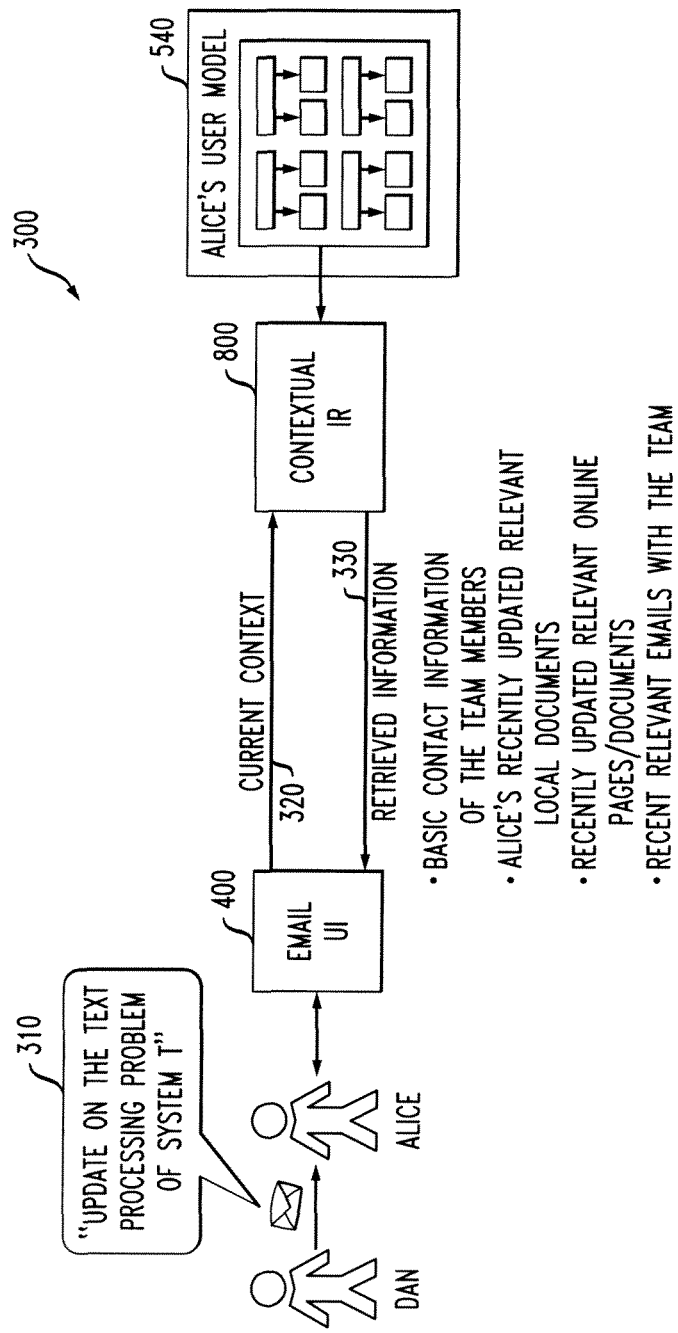

FIGS. 1-3 illustrate an exemplary email exchange for an exemplary email user in accordance with the present invention. FIGS. 1-3 illustrate the automatic presentation of relevant information in accordance with aspects of the present invention, and the tailoring of retrieved content to different situations.

FIG. 1 illustrates an exemplary email exchange 100 for Alice according a first scenario. As shown in FIG. 1, Alice receives an email 110 from an exemplary colleague Bob that works on a different team and in a different field. Alice doesn't know Bob and has had no previous interaction with him. Bob asks about Alice's work on System T and wants to know if it can help his own work. As discussed hereinafter, based on the information extracted from the email 110 (e.g., sender, subject, body), collectively referred to as current context 120, and Alice's user model 540, as discussed further below in conjunction with FIG. 5, built from her email and calendar content, the automated contextual information retrieval email system 500 infers that: 1) Alice is unlikely to be familiar with Bob so she may need some background information on Bob (e.g., job description, location of work); 2) Bob is likely to only be interested in high-level information about the topic without much technical detail; 3) Alice is familiar with the topic and may need access to her local and online documents on this topic when generating a response to Bob. The automated contextual information retrieval email system 500 then employs a contextual information retrieval process 800 (FIG. 8) to automatically formulate queries based on the sender name and the topic keywords of the current message to retrieve relevant content 130 from multiple sources for presentation in a user interface 400, such as the exemplary user interface 400 discussed further below in conjunction with FIG. 4. The retrieved information includes a detailed profile of Bob, related files from Alice's hard drive (e.g., presentations, screen shots), and links to related online documents and resources such as the demo videos, and wiki entries for System T. According to a further aspect of the invention, discussed further below in conjunction with FIG. 4, the information is displayed within the email application, so Alice doesn't have to leave her inbox.

FIG. 2 illustrates an exemplary email exchange 200 for Alice according a second scenario. As shown in FIG. 2, Alice receives an email from Carol. Carol and Alice both work in the area of text analytics but on two different teams. Alice has had infrequent interaction with Carol. Carol wonders if they can find synergy between their projects and collaborate on a prototype that showcases the technologies developed by each team. For this case, as discussed hereinafter, based on the current context 220 and Alice's user model 540, the automated contextual information retrieval email system 500 employs the contextual information retrieval process 800 (FIG. 8) to automatically retrieve: 1) a brief profile description (as a reminder) of Carol; 2) documents on Carol's work; and 3) documents and links for Alice's work which could be shared with Carol, as well as related previous emails between Alice and Carol. Generally, the retrieved content 230 includes greater details in documents (e.g., .doc, .pdf) as well as presentations and videos, relative to the retrieved content associated with FIG. 1.

FIG. 3 illustrates an exemplary email exchange 300 for Alice according a third scenario. As shown in FIG. 3, Alice receives an email from Dan, who works on the same team as Alice. The email is addressed to the whole team and contains an update of the text processing problem the team has been working on lately. In this case, as discussed hereinafter, based on the current context 320 and Alice's user model 540, the automated contextual information retrieval email system 500 determines that 1) Alice doesn't need photos and background information on the team members; 2) the information Alice may need is on a very specific topic and most likely contains technical details; and 3) recency of information becomes more important because of frequency of interaction. Thus, the automated contextual information retrieval email system 500 employs the contextual information retrieval process 800 (FIG. 8) to retrieve from Alice's user model topics specific to Alice's previous interaction with the team, and uses these items to infer the topic of the current email. The keywords associated with the inferred topic are then used to generate queries for retrieving information 330 comprising recently updated relevant documents from online resources (e.g., new entries/documents added to a team wiki) as well as Alice's hard drive, and recent related emails exchanged between some or all of the team members. Messages that belong to the same email thread can be grouped and presented together in the exemplary user interface 400. For Alice's convenience the automated contextual information retrieval email system 500 also provides basic contact information of the team members (e.g., a phone number).

User Interface

Figure 4:
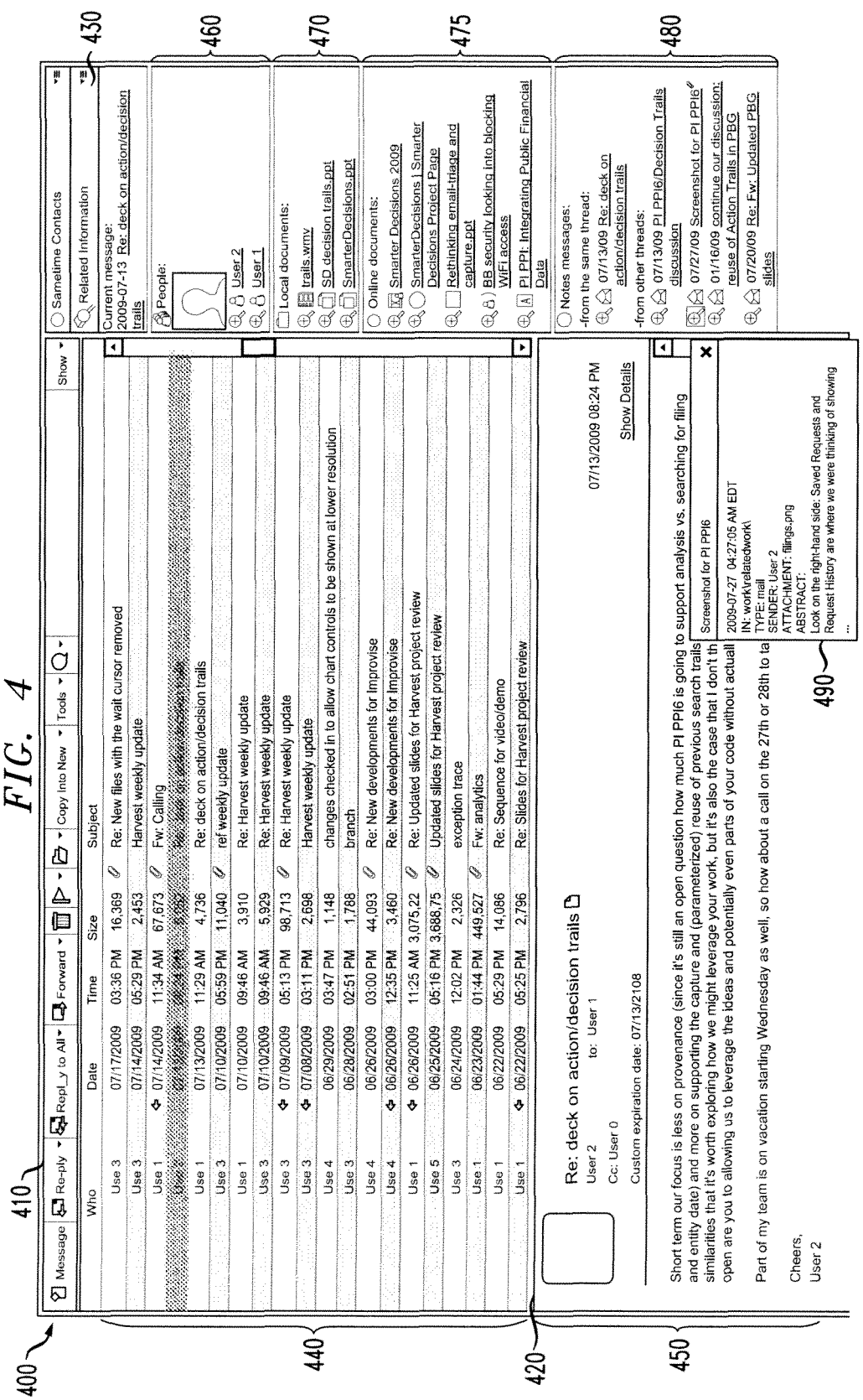
FIG. 4 illustrates an exemplary email interface that incorporates aspects of the present invention.

FIG. 4 illustrates an exemplary email interface 400 that incorporates aspects of the present invention. Generally, the interface component 400 (FIG. 4) communicates with the contextual IR component 800 (FIG. 8) to provide the context information extracted from the email application and surface the retrieved information to the user. As shown in FIG. 4, when the user clicks on a particular email message from a list 440 of messages in his/her inbox 410 (or any user created folder) to read the selected message or generate a response to it, the automated contextual information retrieval email system 500 automatically conducts contextual IR based on the information extracted from the message and the user model.

The selected message 450 is displayed in a preview window 420 and the retrieved information about the selected message 450 is displayed in a panel 430. Entries in the panel 430 are organized into sections by type/source. In the exemplary interface of FIG. 4, the section of "people" 460 includes the profiles of people related to the current message. Documents in the "local documents" section 470 are retrieved from the user's hard drive, while documents in the "online documents" section 475 are retrieved from intranet applications and repositories (e.g., communities, wikis, blogs, file-sharing tools and paper/patent databases), for example, using APIs from an enterprise search system. See, for example, I. Ronen et al., "Social Networks and Discovery in the Enterprise (SaND)," SIGIR '09.

The "notes messages" section 480 includes the messages retrieved from the user's email database, for example, with subsections to distinguish between the messages from the same email thread as the current message and the messages from other related threads. An attachment or link indicator (such as a conventional paper clip icon) can be presented next to a message when the content of this message contains one or more file attachments or embedded web links.

Each entry displayed in the exemplary interface 400 can be hyper-linked. Thus, a single mouse click can open the corresponding profile, document, or message with its associated application (e.g., a view within the current email application, or a browser page). The user can also click on a zoom-in icon (such as a conventional magnifying glass icon) next to an entry, to display a slider 490 with key attributes for this entry (e.g., subject, abstract, attachments, and embedded links of an email).

System Architecture

Figure 5:
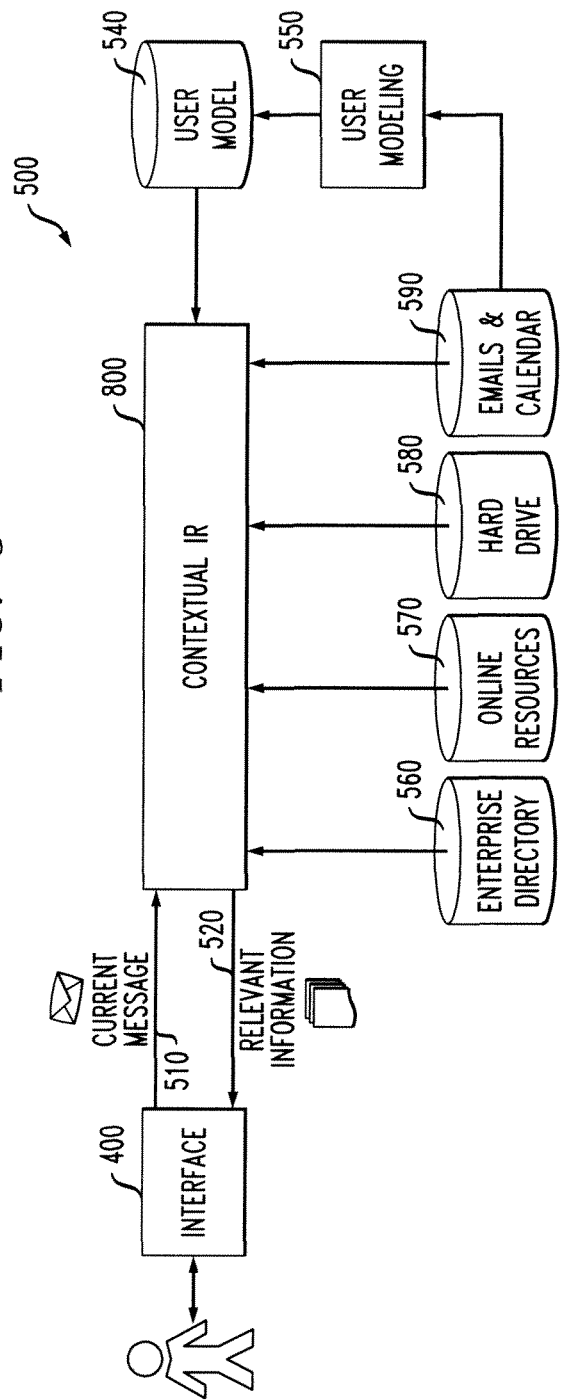
FIG. 5 is a block diagram of an exemplary automated contextual information retrieval email system incorporating features of the present invention.

FIG. 5 is a block diagram of an exemplary automated contextual information retrieval email system 500 incorporating features of the present invention. As shown in FIG. 5, the exemplary automated contextual information retrieval email system 500 comprises a user modeling component 550, discussed further below in conjunction with FIGS. 6 and 7, that employs data structures and algorithms for computing and representing user information in a user model 540, such as how often the user interacts with other individuals or groups through emails and meetings and what topics they discuss.

As previously indicated, the contextual IR component 800, discussed further below in conjunction with FIG. 8, takes the generated user model 540 and the current email message 510 as input and outputs information relevant to the current context using the interface 400. Depending on the user information needs inferred from the user model 540 and the current message 510, the relevant information can come from multiple sources including enterprise directories 560, for example, containing user profiles, online resources 570, such as online communities, wikis, blogs, file-sharing tools (or information repositories), the user's hard drive 580 and the user's email and/or calendar databases 590.

User Modeling

In an exemplary embodiment, the user model 540 is created from the user's email and calendar content, encoding information that can help the automated contextual information retrieval email system 500 determine the dynamic, context-sensitive information needs of the user.

User Model Representation

Figure 6:
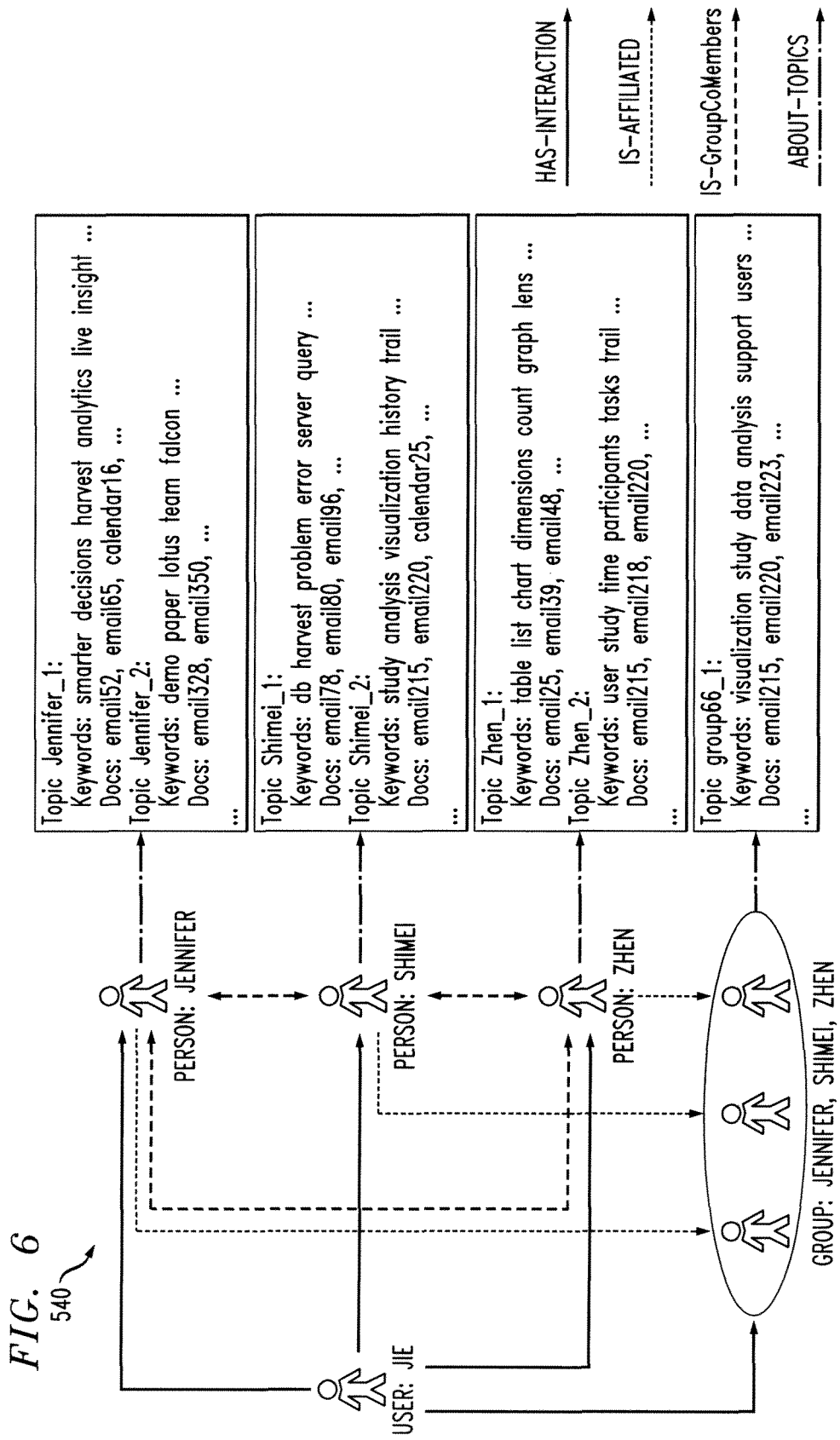
FIG. 6 illustrates an exemplary user model incorporating features of the present invention.

FIG. 6 illustrates an exemplary user model 540 incorporating features of the present invention. As shown in FIG. 6, the exemplary user model 540 encodes multiple tiers of information to represent the user's information at different granularities. For example, basic information is extracted from email and calendar messages, including textual content such as subject and body, as well as metadata about the attached files, the embedded web links, and the persons as email senders/receivers and meeting participants. Aggregate information is created by grouping basic information. Email and calendar messages are grouped into threads by subject. As shown in FIG. 6, persons can be grouped based on their associations with email and calendar messages. Derived information, such as interactions and affiliations, link each person or group that has had interaction with the user to the corresponding set of basic and aggregate information.

Based on the basic, aggregate, and derived information encoded in a user model 540, multiple topic models are created and stored in the user model 540 as well. Each topic model is created based on the aggregate content of the user's interaction within a specific interaction scope. An interaction scope can be an email thread with multiple messages, the interaction with a single person/group, or the user's overall interaction with other people as a whole. A topic model associated with a thread represents the topics discussed in this thread. A topic model associated with a person or group reflects the user's topics of interest specific to this person or group. A general topic model derived from the aggregation of the user's interaction with all others represents the user's overall areas of work. The use of multiple topic models enables a user's topics of interest to be represented at a finer granularity, which yields more accurate inference of the user's context-sensitive information needs, thus resulting in higher relevancy of the retrieved content.

Each topic model contains a set of topics. In an exemplary embodiment, each topic is associated with two types of information: the probability of a word given this topic for all the words, and the probability of this topic given a message for all the messages in the associated interaction scope. The former probability provides a list of representative keywords that describe the topic, while the latter provides a list of messages that are strongly associated with the topic. Topics are derived from content based on statistical language models (see next section for more details).

FIG. 6 also illustrates the information encoded in a user model 540. The user is linked to all the persons she or he has had interaction with through emails and calendar, and the groups of persons derived from the lists of email recipients and meeting participants ("Has-Interaction"). Each person is linked to the group she or he is affiliated with ("Is-Affiliated"). There are also group co-member relations among persons in the same group ("Is-GroupCoMembers"). Each person or group is linked to the topic model associated with this person or group ("About-Topics"). Particularly, FIG. 6 shows three topic models specific to User Jie's interaction with Users Jennifer, Shimei, and Zhen, respectively, and a topic model specific to User Jie's interaction with them as a group.

User Model Creation

Figure 7:
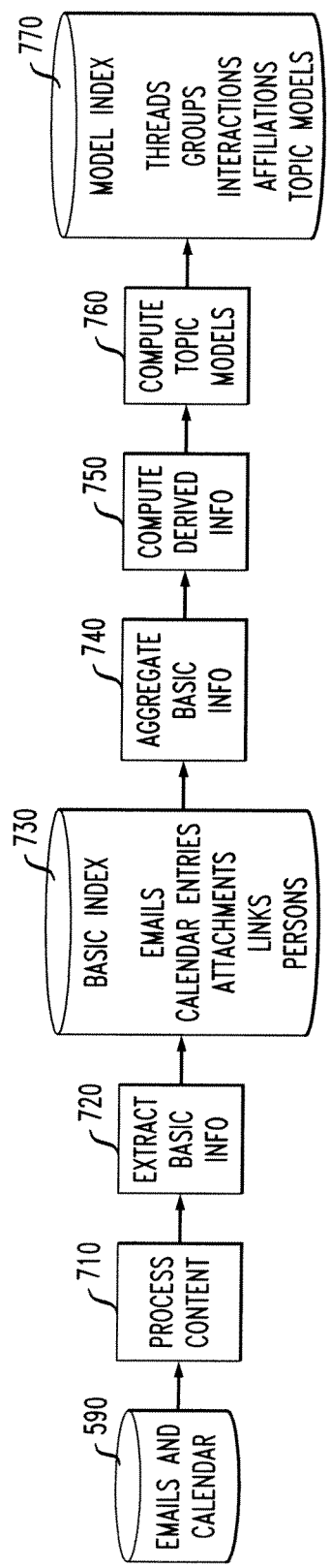
FIG. 7 illustrates an exemplary model creation process for the creation of the user model in further detail.

FIG. 7 illustrates an exemplary model creation process 700 for the creation of the user model 540 in further detail. To build a user model 540, the model creation process 700 first processes the user's email and calendar content 590 during step 710 to extract basic information during step 720. The model creation process 700 creates a basic index 730 using, for example, Lucene™(see, for example, http://lucene.apache.org), which may include email and calendar messages, file attachments, web links, and persons. Then, the model creation process 700 further processes basic information to compute aggregate information during step 740, and derived information during step 750, and derives topics during step 760, to create a model index 770 that contains threads, groups, interactions, affiliations, and topic models. In addition, the model creation process 700 computes a set of statistics such as each term's frequency of occurrences in all the messages, and gathers the organizational and social relationship (for example, using an enterprise search system such as described in I. Ronen et al, "Social Networks and Discovery in the Enterprise (SaND)," SIGIR '09) between the user and each person in the basic index. Such information can be stored in the model index as well. Both indices are updated periodically to incorporate information from new messages.

Creating Multiple Topic Models

As previously indicated, a user model 540 contains multiple topic models each associated with a specific interaction scope. For each interaction scope, the system first creates a text document for each message within this scope by concatenating the subject and body of the message. "Non-content" information (e.g., signature, disclaimer, and text formatting markup) can be removed using heuristic rules. Then, a topic model is created by deriving topics from the collection of these text documents, for example, using a Latent Dirichlet Allocation (LDA) method (see. D. Blei et al., "Latent Dirichlet Allocation." J. of Machine Learning Research, 3:993-1022 (2003)). More specifically, through statistical inference, LDA estimates two topic-related probability distributions: $\Phi(w, t)$: topic-specific word distribution which describes the probability of a word w given a topic t, and $\Theta(d, t)$: document-specific topic distribution which describes the probability of a topic t given a document d.

The exemplary embodiment employs the LDA implementation in MALLET (see, A. McCallum, "MALLET: A Machine Learning for Language Toolkit," http://mallet.cs.umass.edu, 2002) to estimate the main parameters of LDA, i.e. $\Phi(w, t)$ and $\Theta(d, t)$. Other LDA parameters can be determined empirically (e.g., the number of topics in each topic model is proportional to the number of messages included in the associated interaction scope). To ensure the quality of the derived topics, a person/group-specific topic model is created only when there are at least 10 messages, and a thread-specific topic model requires at least 5 messages. Topic models can be periodically updated to incorporate new messages overtime.

Contextual Information Retrieval

Figure 8:
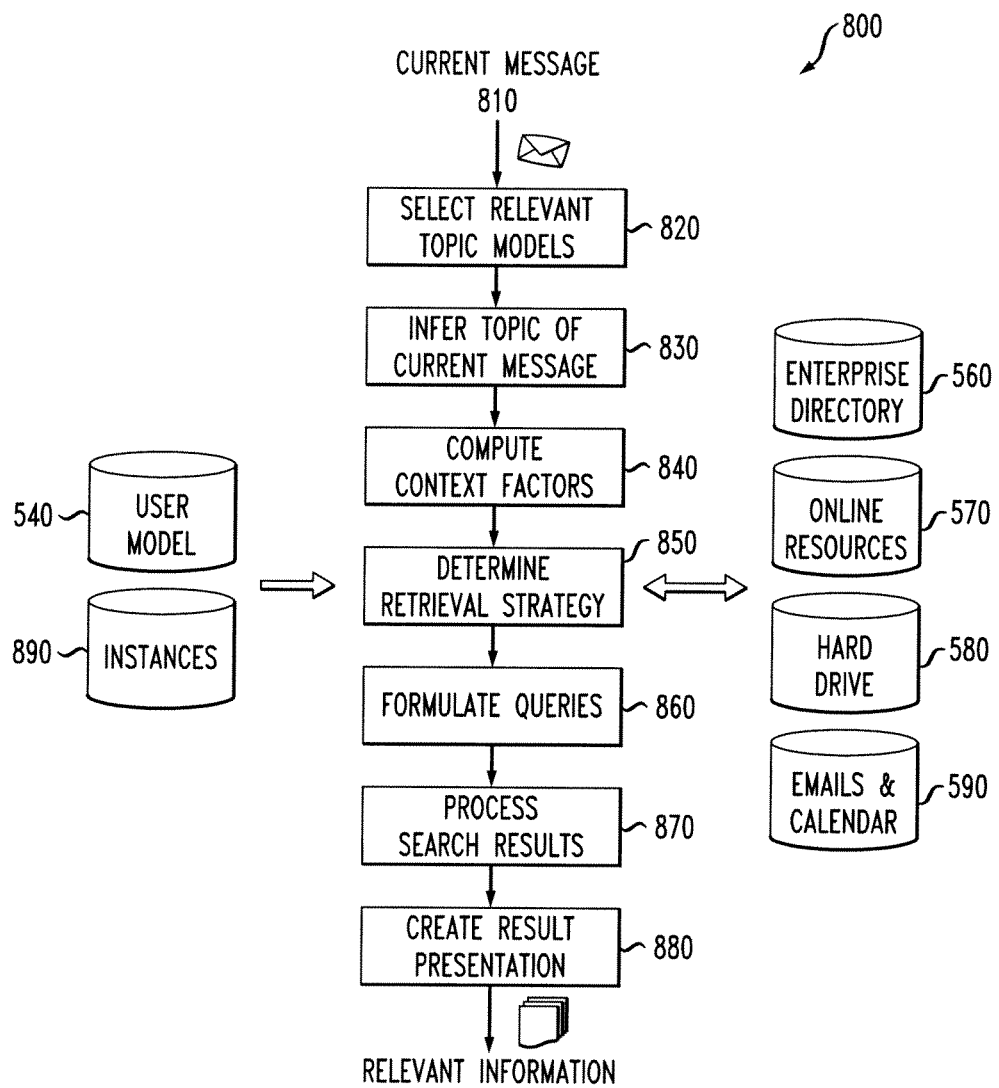
FIG. 8 is a flow chart describing an exemplary implementation of a contextual information retrieval process that incorporates features of the present invention.

FIG. 8 is a flow chart describing an exemplary implementation of a contextual information retrieval process 800 that incorporates features of the present invention. As shown in FIG. 8, the exemplary contextual information retrieval process 800 initially receives information extracted from the current email message 810, such as sender, subject, and body. During step 820, as discussed further below in the section entitled "Selecting Relevant Topic Models," the process 800 selects one or more topic models to best infer the topic of the current message during step 830. Thereafter, during step 840, as discussed further below in conjunction with FIG. 9, the process 800 computes the values of a set of context factors 900, such as whether the current message is threaded the frequency and recency of the user's interaction with the sender, the user's organizational/social relationship with the sendec and the user's degree of familiarity with the topic of the current message.

Based on the context factors computed during step 840, the process 800 next determines its retrieval strategy during step 850 in the form of a set of retrieval factors 1000, discussed further below in conjunction with FIG. 10. Guided by the retrieval factors 1000, the contextual information retrieval process 800 then formulates queries during step 860 to search one or more sources, processes the results returned from them during step 870, and creates a presentation of relevant information to display to the user during step 880.

As shown in FIG. 8, the contextual information retrieval process 800 employs the user model 540, as well as the enterprise directories 560, online resources 570, user's hard drive 580 and the user's email and/or calendar databases 590, as discussed above in conjunction with FIG. 5. The instances 890 shown in FIG. 8 are discussed below in the section entitled "Determining Retrieval Strategy."

Selecting Relevant Topic Models

As indicated above, during step 820, the contextual information retrieval process 800 selects one or more topic models. With multiple topic models representing the user's granular topics of interest within different interaction scopes, the problem of which topic model(s) to use for inferring the topic of the current message arises. One solution is to calculate the degree of match between the interaction scope of each topic model and that of the current message, and select the model(s) whose matching score(s) is/are above a threshold.

For a thread-specific interaction scope, the degree of match between the associated topic model and the message is 1 if the model represents the same thread that this message belongs to and 0 otherwise. For a person-specific interaction scope, if the message is an incoming email, its degree of match against the topic model associated with the sender is 1. If the message is an outgoing email, its degree of match against the topic model associated with any of the direct (i.e., not copied on) recipients is 1. All other person-specific topic models receive a matching score of 0. For a group-specific interaction scope, the degree of match between the associated topic model and the message is computed based on the degree of overlap o among members of the model's group g' and those of the message's group g (which includes all the people associated with the message, i.e. sender, direct and indirect recipients), as well as the average normalized co-membership strength s between members of these two groups (Formulas 1-3):

$$\text{match}(g, g') = 0.5 \times o(g, g') + 0.5 \times s(g, g') \quad (1)$$

$$o(g, g') = \frac{\#\text{common\_members}(g, g')}{(|g| + |g'|)/2} \quad (2)$$

$$s(g, g') = \frac{\sum_{m \in g} \sum_{m' \in g'} \frac{\#\text{common\_groups}(m, m')}{\max_{m'' \in g'} (\#\text{common\_groups}(m, m''))}}{|g| \times |g'|} \quad (3)$$

where # denotes "the number of" and |•| denotes the size of the group.

The topic models whose matching scores are above a threshold (for example, 0.6) are considered relevant topic models. If none of the above topic models have a score greater than the threshold, the general topic model (derived from all of the user's email and calendar content) is selected and returned.

Inferring the Topic of the Current Message

As indicated above, during step 830, the contextual information retrieval process 800 infers the main topic discussed in the current email message by identifying the best topic that can explain the current message from the selected relevant topic models. For each relevant topic model, the system computes the topic distribution of the current email message based on the probability distributions encoded in the model. See, for example, D. Blei et al., "Latent Dirichlet Allocation," J. of Machine Learning Research, 3:993-1022 (2003) or A. McCallum. "MALLET: A Machine Learning for Language Toolkit," http://mallet.cs.umass.edu (2002). The topic with the highest probability is considered the best topic within this topic model. Then, the contextual information retrieval process 800 chooses the topic with the highest overall probability among the best topics from all the relevant topic models as the inferred topic of the current message.

The inferred topic t has two types of information associated with it: a list of keywords, and a set of messages. The keywords are the top-ranked words that have the highest topic specific word probabilities in $\Phi(w, t)$. They are used in determining the query terms for retrieval. The messages are the top-ranked documents that have the highest document specific topic probabilities in $\Theta(d, t)$. They are useful for filtering the retrieved messages during result processing.

Determining Retrieval Strategy

As indicated above, during step 850, the contextual information retrieval process 800 determines a retrieval strategy. The goal of contextual information retrieval is to provide relevant information to satisfy the user's context-sensitive information needs. Because the user's information needs vary depending on the message and context, the system dynamically determines its retrieval strategy for selecting sources to search, formulating queries, and processing search results in order to optimize the relevance and usefulness of the information it provides to the user within the limited space of the interface.

To help the contextual information retrieval process 800 infer the user's context-sensitive information needs, a set of context factors 900 are defined that represent different aspects of the current context. FIG. 9 is a sample table comprising an exemplary set of context factors 900. Each context factor has a normalized value between 0 and 1 so that the values of different context factors have the same scale. For each context factor identified in field 910, the context factor table 900 identifies the corresponding function for computing the context factor in field 920. FIG. 10 is a sample table comprising an exemplary set of retrieval factors 1000. A retrieval strategy is represented with a set of retrieval factors that imply different user information needs. The process of determining a retrieval strategy is thus the process of mapping from the values of context factors to those of retrieval factors. For each retrieval factor identified in field 1010, the retrieval factor table 1000 identifies the corresponding value set for the retrieval factor in field 1020.

The exemplary embodiment employs an instance-based mapping algorithm (S. Pan, "A Multi-Layer Conversation Management Approach for Information Seeking Applications," ICSLP '04) due to its advantages in flexibility and extensibility over the rule-based algorithm with hard-coded rules. An instance consists of two parts: situation and decision. Using a vector representation, where each dimension of the vector corresponds to a particular context factor, a situation represents a particular value combination of context factors. A decision uses a similar vector representation to encode a particular value combination of retrieval factors. The instance-based algorithm matches the situations derived from the current context against each situation s' of all example instances, and returns the decision associated with the instance that has the best matched situation i.e., with the smallest distance d calculated using Formula 4):

$$d(s, s') = \sum_c |v(c, s) - v(c, s')| \qquad (4)$$

where c denotes a context factor 900 listed in FIG. 9, v(c, s) and v(c, s') denote the values of the context factor c in the situations s and s' respectively, and |•| denotes the absolute value. A summation-based metric can be selected over the standard cosine similarity metric due to its simplicity, interpretability and low computational cost.

The example instances may be determined empirically based on observations, or automatically learned using machine learning techniques based on explicit or implicit relevance feedback provided by the user through interactions with the system.

Formulating Queries

As indicated above, during step 860, the contextual information retrieval process 800 formulates queries. The queries used for retrieving people's profile information (from an enterprise employee directory 560) are created based on the name and email address of each person associated with the current message as a sender or direct recipient. The queries used for document retrieval (from the user's email database 590, hard drive 580, and online resources 570) are automatically generated based on the prominent words contained in the current message as well as the keywords associated with the inferred topic of the current message. Specifically, to determine query terms, the exemplary contextual information retrieval process 800 first extracts all the words from the subject and body of the current message (optionally excluding stopwords and "non-content" information such as signature, disclaimer, and text formatting markup) to create a context vector of terms. The weight of each term is its frequency of occurrences in the content of the current message multiplied by its inverse document frequency (the number of existing messages from the user model that contain the term).

Next, the exemplary contextual information retrieval process 800 obtains the list of the 20 top-ranked keywords associated with the inferred topic of the current message. Because the weights of these keywords generated by the topic inference algorithm may not be compatible with the term weights in the context vector, they may not be directly combined. One approach to combine two term weights is for the contextual information retrieval process 800 to increase the weight of a context vector term by a fixed percentage if it occurs in this topic keyword list to boost terms that are representative of the inferred topic. An empirically determined value of 50% can be used.

Finally, the exemplary contextual information retrieval process 800 selects the 5 top-ranked context vector terms as the primary query terms. The 5 top-ranked topic keywords that are not stopwords, person names, or primary query terms are added as expansion query terms.

For selected sources that support other search parameters in addition to query terms, the exemplary contextual information retrieval process 800 generates the values for these parameters based on the retrieval strategy determined. For example, if the value of the "doc_author" retrieval factor indicates that the system should restrict the retrieved online documents to be those authored by the user/sender, the user/sender's identity is included in the query for searching online resources that support filtering results by person. If a source allows the query to specify how the retrieval results should be sorted (e.g., by date or by relevance), the exemplary contextual information retrieval process 800 includes the specification based on the value of the "sort_by" retrieval factor.

Processing Search Results

As indicated above, during step 870, the contextual information retrieval process 800 processes the search results. The top-ranked search results returned from the selected sources (e.g., based on source-specific cutoff thresholds) are further processed prior to being displayed in the interface 400. The means by which the results are processed depends on the values of the relevant retrieval factors, including "profile_type", "doc_type", and "msg_filter".

To process a result returned from a directory of people's profiles, the exemplary contextual information retrieval process 800 checks the value of "profile_type" and extracts the required information, as discussed above in conjunction with FIGS. 1-3. A "min" profile requires basic information about a person such as name, email, and phone number. It serves the purpose of providing the user easy access to the contact information of people whom the user interacts with frequently. A "short" profile requires a person's photo in addition to the standard contact information, which can help refresh the user's memory about someone s/he has interacted with infrequently. A "long" profile requires the most information about a person, including contact information, photo, geography, and job description. It is the most comprehensive type of profile but also requires the most space real estate at the interface. Therefore, it is only necessary for people with whom the user has little previous interaction.

For each document in the search results returned from the user's hard drive 580 or online resources 570, the exemplary contextual information retrieval process 800 determines its type and discards the document if the type is not included in the value of the "doc_type" retrieval factor. Currently, two types of documents are distinguished: "basic" for documents targeted at a general audience, and "detailed" for documents geared towards an audience with relevant background. The type of a document can be determined with a simple algorithm that classifies a document based on the extension of its name and its source. For example, a file with a ".ppt", ".avi", or ".wmv" name extension or a starting web page of an online community/wiki is considered "basic", while a file with a ".doc", ".xls", ".ps", etc. name extension or a web page from an online paper/patent database is considered "detailed". If the need for more granular document types and a more sophisticated classification algorithm arises in applications, the system can easily be extended to incorporate them.

For messages retrieved from the user's email database 590, the exemplary contextual information retrieval process 800 filters them based on the value of the "msg_filter" retrieval factor. If the value is "thread", the system discards the messages that do not belong to the same thread as the current email message. If the value is "person" or "group", the system discards the messages that are not associated with the person or group of the current message. To further improve the relevance of the messages to be presented to the user, the exemplary contextual information retrieval process 800 also discards the messages that do not have a strong association with the inferred topic of the current message.

Finally, the exemplary contextual information retrieval process 800 performs duplicate removal, and removes redundancy from threaded messages by discarding any message whose content is already fully contained in the later messages of the same thread.

The disclosed automated contextual information retrieval email system 500 automatically provides relevant content at the fingertips of an email user based on the current email message the user is working with and a user model created from his/her email and calendar content. According to one aspect of the invention, a multi-tiered user model encodes basic, aggregate, and derived information, as well as topic models for the user's interaction with others at the level of persons, groups, and email threads. Such a fine-grained user model helps the system identify more accurately the topic of the current message and the user's information needs.

According to another aspect of the invention, the disclosed automated contextual information retrieval email system 500 employs a dynamic retrieval strategy that uses context information (e.g., how often the user interacts with the sender and the user's familiarity with the topic of the current message) to determine which sources to search, how to formulate queries, and how to process retrieval results to optimize the value of the information displayed within the limited space of the interface.

Exemplary System and Article of Manufacture Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

As noted, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Media block is a non-limiting example. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Figures 10, 11:
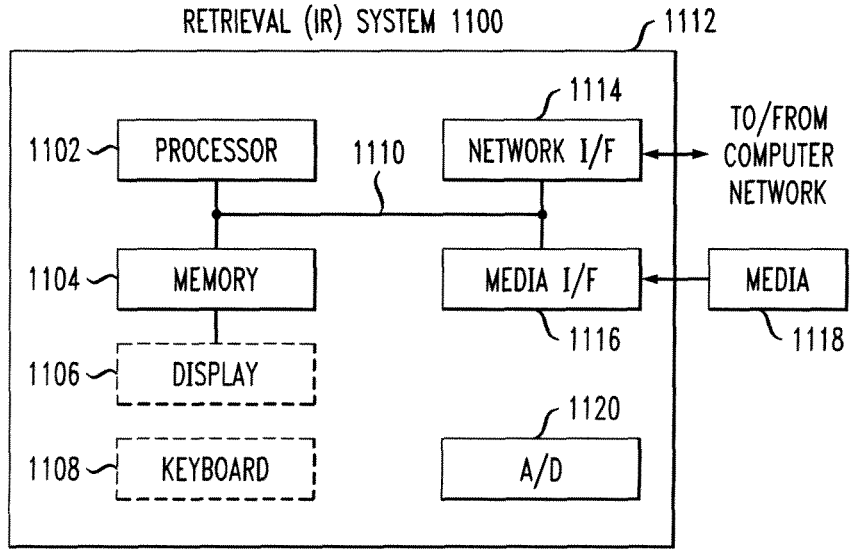
FIG. 10 is a sample table comprising an exemplary set of retrieval factors.
FIG. 11 is a schematic block diagram of an automated contextual information retrieval (IR) system incorporating features of the present invention.

FIG. 11 is a schematic block diagram of an automated contextual information retrieval (IR) system 1100 incorporating features of the present invention. Generally, as discussed further below, the contextual IR system 1100 employs a user model and a current email message and generates information relevant to the current context for efficient presentation to the user.

One or more embodiments of the invention, or elements thereof, can be implemented in the form of an apparatus including a memory and at least one processor that is coupled to the memory and operative to perform exemplary method steps. One or more embodiments can make use of software running on a general purpose computer or workstation. FIG. 11 depicts a computer system 1100 that may be useful in implementing one or more aspects and/or elements of the present invention. With reference to FIG. 11, such an implementation might employ, for example, a processor 1102, a memory 1104, and an input/output interface formed, for example, by a display 1106 and a keyboard 1108. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 1102, memory 1104, and input/output interface such as display 1106 and keyboard 1108 can be interconnected, for example, via bus 1110 as part of a data processing unit 1112. Suitable interconnections, for example via bus 1110, can also be provided to a network interface 1114, such as a network card, which can be provided to interface with a computer network, and to a media interface 1116, such as a diskette or CD-ROM drive, which can be provided to interface with media 1118. Analog-to-digital converter(s) 1120 may be provided to receive analog input, such as analog video feed, and to digitize same. Such converter(s) may be interconnected with system bus 1110.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 1102 coupled directly or indirectly to memory elements 1104 through a system bus 1110. The memory elements can include local memory employed during actual implementation of the program code, bulk storage, and cache memories which provide temporary storage of at least some program code in order to reduce the number of times code must be retrieved from bulk storage during implementation. Input/output or I/O devices (including but not limited to keyboards 1108, displays 1106, pointing devices, and the like) can be coupled to the system either directly (such as via bus 1110) or through intervening I/O controllers (omitted for clarity).

Network adapters such as network interface 1114 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system running a server program. It will be understood that such a physical server may or may not include a display and keyboard.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the FIGS. illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Method steps described herein may be tied, for example, to a general purpose computer programmed to carry out such steps, or to hardware for carrying out such steps, as described herein. Further, method steps described herein, including, for example, obtaining data streams and encoding the streams, may also be tied to physical sensors, such as cameras or microphones, from whence the data streams are obtained.

It should be noted that any of the methods described herein can include an additional step of providing a system comprising distinct software modules embodied on a computer readable storage medium. The method steps can then be carried out using the distinct software modules and/or sub-modules of the system, as described above, executing on one or more hardware processors. In some cases, specialized hardware may be employed to implement one or more of the functions described here. Further, a computer program product can include a computer-readable storage medium with code adapted to be implemented to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for automatically presenting content relevant to a current message, said method comprising:

obtaining a multi-tiered user model containing a multi-tiered representation of pair-wise interactions of a first user with each of one or more contacts, wherein the multi-tiered representation includes a plurality of topic models, wherein each of the topic models is generated from a pair-wise interaction between the first user and one of the contacts for at least one communication outside of a communication thread of said current message, wherein each of the topic models contains a set of topics, wherein each topic is associated with (i) a first probability of a word given the topic for substantially all words, wherein the first probability provides a list of topic keywords that describe the topic, and (ii) a second probability of the topic given a message for substantially all messages in the associated pair-wise interaction, wherein the second probability provides a list of messages associated with the topic;

extracting context information of a current message based on a content of the current message, one or more of a sender and a recipient of the current message, and the multi-tiered user model;

determining the topic of the current message by computing a topic distribution of the current message based on the second probabilities for each topic and selecting the topic with the highest probability;

determining a retrieval strategy based on the extracted context information of the current message;

selecting from a set of information repositories for contextual information retrieval based on the determined retrieval strategy, wherein the set of information repositories comprises one or more of people directories, a local memory, one or more online repositories, an email repository and a calendar entry repository, wherein at least one information repository in said set is outside of said communication thread of said current message;

generating one or more contextual queries for document retrieval based on one or more words contained in the current message and one or more keywords associated with the determined topic of the current message to search the selected information repositories; and presenting the content relevant to the current message from the selected information repositories based on the one or more contextual queries.

2. The method of claim 1, wherein the contacts comprise one or more of email contacts, calendar contacts, groups of email contacts and groups of calendar contacts.

3. The method of claim 1, wherein the multi-tiered user model is obtained by extracting and aggregating information from email and calendar content of the first user, and applying statistical techniques to create topic models corresponding to pair-wise interactions of the first user with each of the contacts of said first user.

4. The method of claim 1, wherein the current message comprises one or more of an email message, a text message and a transcribed voice mail message.

5. The method of claim 1, wherein the contextual queries to search the selected information repositories are determined based on the content of the current message, the topic keywords contained in a determined topic of the current message, one or more of the sender and recipient of the current message, and the determined retrieval strategy.

6. The method of claim 1, further comprising the step of selecting one or more topic models from the multi-tiered user model based on one or more of a sender and recipient of the current message, and matching the content of the current message to the topics of the selected topic models to find the best topic.

7. The method of claim 1, wherein the content relevant to the current message is determined by processing the search results from the selected information repositories based on the context of the current message and the determined retrieval strategy.

8. A system for automatically presenting content relevant to a current message, said system comprising:
    a memory; and
    at least one processor, coupled to the memory, operative to:
    obtain a multi-tiered user model containing a multi-tiered representation of pair-wise interactions of a first user with each of one or more contacts, wherein the multi-tiered representation includes a plurality of topic models, wherein each of the topic models is generated from a pair-wise interaction between the first user and one of the contacts for at least one communication outside of a communication thread of said current message, wherein each of the topic models contains a set of topics, wherein each topic is associated with (i) a first probability of a word given the topic for substantially all words, wherein the first probability provides a list of topic keywords that describe the topic and (ii) a second probability of the topic given a message for substantially all messages in the associated pair-wise interaction, wherein the second probability provides a list of messages associated with the topic;
    extract context information of a current message based on a content of the current message, one or more of a sender and a recipient of the current message, and the multi-tiered user model;
    determine the topic of the current message by computing a topic distribution of the current message based on the second probabilities for each topic and selecting the topic with the highest probability;
    determine a retrieval strategy based on the extracted context information of the current message;
    select from a set of information repositories for contextual information retrieval based on the determined retrieval strategy, wherein the set of information repositories comprises one or more of people directories, a local memory, one or more online repositories, an email repository and a calendar entry repository, wherein at least one information repository in said set is outside of said communication thread of said current message;
    generate one or more contextual queries for document retrieval based on one or more words contained in the current message and one or more keywords associated with the determined topic of the current message to search the selected information repositories; and
    present the content relevant to the current message from the selected information repositories based on the one or more contextual queries.

9. The system of claim 8, wherein the multi-tiered user model is obtained by extracting and aggregating information from email and calendar content of the first user, and applying statistical techniques to create topic models corresponding to pair-wise interactions of the first user with each of the contacts of said first user.

10. The system of claim 8, wherein the current message comprises one or more of an email message, a text message and a transcribed voice mail message.

11. The system of claim 8, wherein the contextual queries to search the selected information repositories are determined based on the content of the current message, the topic keywords contained in a determined topic of the current message, one or more of the sender and recipient of the current message, and the determined retrieval strategy.

12. The system of claim 8, wherein said processor is further configured to select one or more topic models from the multi-tiered user model based on one or more of a sender and recipient of the current message, and matching the content of the current message to the topics of the selected topic models to find the best topic.

13. The system of claim 8, wherein the content relevant to the current message is determined by processing the search results from the selected information repositories based on the context of the current message and the determined retrieval strategy.

14. An article of manufacture for automatically presenting content relevant to a current message, comprising a tangible machine readable recordable medium containing one or more programs which when executed implement the steps of:
    obtaining a multi-tiered user model containing a multi-tiered representation of pair-wise interactions of a first user with each of one or more contacts, wherein the multi-tiered representation includes a plurality of topic models, wherein each of the topic models is generated from a pair-wise interaction between the first user and one of the contacts for at least one communication outside of a communication thread of said current message, wherein each of the topic models contains a set of topics, wherein each topic is associated with (i) a first probability of a word given the topic for substantially all words, wherein the first probability provides a list of topic keywords that describe the topic, and (ii) a second probability of the topic given a message for substantially all messages in the associated pair-wise interaction, wherein the second probability provides a list of messages associated with the topic;

extracting context information of a current message based on a content of the current message, one or more of a sender and a recipient of the current message, and the multi-tiered user model;

determining the topic of the current message by computing a topic distribution of the current message based on the second probabilities for each topic and selecting the topic with the highest probability;

determining a retrieval strategy based on the extracted context information of the current message;

selecting from a set of information repositories for contextual information retrieval based on the determined retrieval strategy, wherein the set of information repositories comprises one or more of people directories, a local memory, one or more online repositories, an email repository and a calendar entry repository, wherein at least one information repository in said set is outside of said communication thread of said current message;

generating one or more contextual queries for document retrieval based on one or more words contained in the current message and one or more keywords associated with the determined topic of the current message to search the selected information repositories; and presenting the content relevant to the current message from the selected information repositories based on the one or more contextual queries.

15. The article of manufacture of claim 14, wherein the contacts comprise one or more of email contacts, calendar contacts, groups of email contacts and groups of calendar contacts.

16. The article of manufacture of claim 14, wherein the multi-tiered user model is obtained by extracting and aggregating information from email and calendar content of the first user, and applying statistical techniques to create topic models corresponding to pair-wise interactions of the first user with each of the contacts of said first user.

17. The article of manufacture of claim 14, wherein the current message comprises one or more of an email message, a text message and a transcribed voice mail message.

18. The article of manufacture of claim 14, wherein the contextual queries to search the selected information repositories are determined based on the content of the current message, the topic keywords contained in a determined topic of the current message, one or more of the sender and recipient of the current message, and the determined retrieval strategy.

19. The article of manufacture of claim 14, further comprising the step of selecting one or more topic models from the multi-tiered user model based on one or more of a sender and recipient of the current message, and matching the content of the current message to the topics of the selected topic models to find the best topic.

20. The article of manufacture of claim 14, wherein the content relevant to the current message is determined by processing the search results from the selected information repositories based on the context of the current message and the determined retrieval strategy.

* * * * *